United States Patent
Toyama et al.

(10) Patent No.: US 6,680,870 B2
(45) Date of Patent: Jan. 20, 2004

(54) MEMORY DEVICE, DATA PROCESSING METHOD AND DATA PROCESSING PROGRAM

(75) Inventors: Masayuki Toyama, Neyagawa (JP); Tsutomu Sekibe, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/351,339

(22) Filed: Jan. 27, 2003

(65) Prior Publication Data

US 2003/0142543 A1 Jul. 31, 2003

(30) Foreign Application Priority Data

Jan. 29, 2002 (JP) .......................................... 2002-019690

(51) Int. Cl.⁷ ............................................... G11C 16/04
(52) U.S. Cl. ................... 365/189.09; 365/711; 365/202
(58) Field of Search ...................... 365/189.09, 189.01; 711/202, 103, 206, 209

(56) References Cited

U.S. PATENT DOCUMENTS 5,963,718 A * 10/1999 Muramatsu ................... 714/54
5,963,983 A * 10/1999 Sakakura et al. ............ 711/202
6,388,908 B1 * 5/2002 Araki et al. ................... 365/45

FOREIGN PATENT DOCUMENTS

JP          11-203885          7/1999

\* cited by examiner

Primary Examiner—Vu A. Le
(74) Attorney, Agent, or Firm—McDermott, Will & Emery (57) ABSTRACT

A memory device that is free from problems resulted from the characteristics of nonvolatile memory chips. The problems are specifically those occurring at the time of data transfer between nonvolatile memory chips, e.g., data error or program error occurring after data transfer. In the memory device, an error correction code process unit applies error detection to data read from a nonvolatile memory chip to a data line for data transfer. For such detection, an error correction code for the data is referred to. At the time of data transfer between the nonvolatile memory chips, if the data is detected as containing a correctable error, a writing unit writes the corrected data to a nonvolatile memory, which is the transfer destination. In this manner, at the time of data transfer between the nonvolatile memory chips, the error never fails to be detected before data writing.

15 Claims, 6 Drawing Sheets

MEMORY DEVICE, DATA PROCESSING METHOD AND DATA PROCESSING PROGRAM

BACKGROUND OF THE INVENTION

1. Field of the Invention

The present invention relates to a memory device in which a nonvolatile memory chip is plurally provided to be separately controllable but sharing the same data line, and a method and program for data processing in the memory device.

2. Description of the Related Art

A memory device having nonvolatile memory applied therein allows data rewriting, and requires no battery backup. Here, the nonvolatile memory is exemplified by flash memory. Due to its high portability, the flash memory has recently become popular for memory devices in portable devices, which handle music data, video data or the like. Not only having built-in flash memory, digital cameras, audio players, and PDAs also mostly include a slot for a removable memory card exemplified by an SD card. The slot is used for data exchange between devices or capacity selection of a flash memory. As the application range is extended, the demand has been growing for the flash memory to be larger in capacity and faster in access speed.

As to the access speed of the flash memory, carrying out a save process causes speed reduction. The save process is for saving any needed data before deleted. When receiving a request for data writing, a flash memory device determines whether data is already carried by a physical page, of pages each being a writing unit, corresponding to a logic address accompanying the request or not. The flash memory does not allow overwriting. Accordingly, in a case where the corresponding page is already carrying data, data writing is executed to any writable block of physical blocks each being a data deletion unit other than the block including the page. If this is the case, the data which has been previously included is deleted due to newly written data. The issue here is that, if one block includes a plurality of pages, data deletion is executed not only to the page requested in logic address for data writing but also to any other pages included in the same block. This often happens if the flash memory is large in capacity because of the high need for a physical block therein including a plurality of pages. As a result, in a specific block, not only data in a page requested for data writing, data in other pages is also deleted with no choice. The save process is carried out for saving such needed data before deleted.

In such a save process, usually, data saving is temporarily done to a buffer after data reading. Here, data to be read is, in a block including a page requested for data writing, the one written in pages not requested for data writing. After data saving is done, the data in the block including the page requested for data writing is all deleted. Then, to the pages in the block carrying no data after deletion, written is the data once saved exemplarily in the buffer and data coming from an external data input/output device. By going through such a save process, data protection is successfully applied to data in pages not requested for data writing in a block including a requested page.

The problem of the save process is that the writing speed is reduced thereby. For betterment, in the memory device disclosed in Japanese Patent Laid-Open Publication No. 1999-203885, no buffer saving is done to data, in a block including a page requested for data writing, included in pages not requested for data writing.

This memory device is plurally provided with a semiconductor memory chip. Data inputted from any external data input/output device and data read for data saving is written to a block carrying no data after data deletion in the semiconductor memory chip. Here, the semiconductor memory chip is the one not including a block having a page requested for data writing.

The issue here is that the flash memory possibly causes data error at the time of data reading, and this is not neglectable. Therefore, not only in the save process, data transfer between the flash memory chips as disclosed may also result in erroneous data writing.

Further, a program error may occur during data writing. If it occurs at the time of data writing for data transfer between the flash memory chips, the data has to be read again from the corresponding flash memory chip. Such rereading from the flash memory chip requires a considerable amount of power consumption, and takes a long time.

What is more, at the time of data move between the flash memory chips, if power is shut down before data deletion from one flash memory chip being a data source, there is no clue which flash memory chip carries the newer data when the power is turned on.

As such, even with data transfer between nonvolatile memory chips aimed to avoid reducing the access speed, problems resulted from the characteristics of the nonvolatile memory chips still come up.

SUMMARY OF THE INVENTION

The present invention has proposed in consideration of the above conventional problems, and an object thereof is to provide a memory device free from such problems associated with data transfer between nonvolatile memory chips.

The present invention is adopting the following unit to achieve the above object.

In the memory device of the present invention, a nonvolatile memory chip is plurally provided to be separately controllable but sharing the same data line. In this memory device, an error correction code process unit generates an error correction code, which is written to the nonvolatile memory chip together with the corresponding data. To detect if there is any error in the data read to the data line from the nonvolatile memory chip, the error correction code process unit refers to the error correction code attached to the data. If detected any, the error is accordingly corrected.

Here, when the data read to the data line is written to any one of the nonvolatile memory chips different from the one from which the data is read, if the data is detected as containing a correctable error, the writing unit performs data writing after the error is corrected.

In this manner, even if the read data contains any error, the error never fails to be detected before data writing.

Further, if the memory device is provided with a buffer for temporary data storage, even if the data contains any correctable error, the error correction code process unit can apply error correction to data stored into the buffer from the data line.

As a result, there is no more need to access the corresponding nonvolatile memory chip for error correction.

The management information process unit generates management information, which is to be written with the corresponding data for management thereof. Not only to any incoming data, the management information is also generated to data read to the data line and then written to a nonvolatile memory chip different from the one from which the data is read.

The writing unit performs data writing to the nonvolatile memory chip after addition of the resulting management information.

In this manner, at the time of data move between nonvolatile memory chips, even if power is shut down before data deletion in a data source, there is a clue which flash memory chip carries the newer data when the power is turned on.

If the memory device is provided with a buffer, the writing unit can use the data stored into the buffer from the data line if any program error occurs to the data read to the data line and then transferred to a nonvolatile memory chip different from the one from which the data is read. As to the data stored in the buffer, the writing unit simply writes the data as it is.

Accordingly, as to the data stored in the buffer, there is no more need for rereading from the corresponding nonvolatile memory chip, successfully leading to less power consumption and shorter time for data reading.

In the memory device, the above described error correction code process unit, the management information process unit, and the buffer may be used in combination with the writing unit.

If so, when the data contains any uncorrectable error, the management information process unit provides the management information of the data with uncorrectable error detection information to indicate that the detected error is uncorrectable.

As such, it becomes easy to determine whether the data contains any uncorrectable error or not.

Here, the nonvolatile memory chip is a flash memory chip including a block being a data deletion unit having a plurality of pages each being a data writing unit. To save data in a page before data deletion applied to the entire block, block selection unit selects a block including a page to which the data to be saved goes. The selection is made out of writable blocks in any flash memory chip(s) not including the block to be deleted.

The data to be saved is read to the data line, and at the same time, written to a nonvolatile memory chip different from the one from which the data is read. Because the nonvolatile memory chips are each separately controllable, the save process can be executed with direct memory access at high speed. Moreover, the above described problems resulted from the nonvolatile memory chips are successfully solved.

In another aspect, the present invention provides a data processing method for the memory device.

In the data processing method, data error detection is performed when data read to the data line is written to a nonvolatile memory chip different from the one from which the data is read. If the data is detected as containing any correctable error, the data error is corrected before data writing.

Alternatively, when data read to the data line is written to a nonvolatile memory chip different from the one from which the data is read, management information may be generated for managing the data. Then, the resulting management information may be added to the data before writing to the nonvolatile memory chip.

If a program error occurs to data transferred to a nonvolatile memory chip from another over the data line, data stored into a buffer from the data lien may be written to the corresponding nonvolatile memory chip.

In still another aspect, the present invention provides a program to have a computer device execute the data processing method as described above. The program is often installed in the memory device, or operates on an external data input/output device. For commercial purpose, the program is surely stored in a computer-readable recording medium such as CD-ROMs, or provided over a telecommunication line such as the Internet.

These and other objects, features, aspects and advantages of the present invention will become more apparent from the following detailed description of the present invention when taken in conjunction with the accompanying drawings.

DESCRIPTION OF THE PREFERRED EMBODIMENTS

In the below, described is an embodiment of the present invention by referring to the accompanying drawings.

Figure 1:
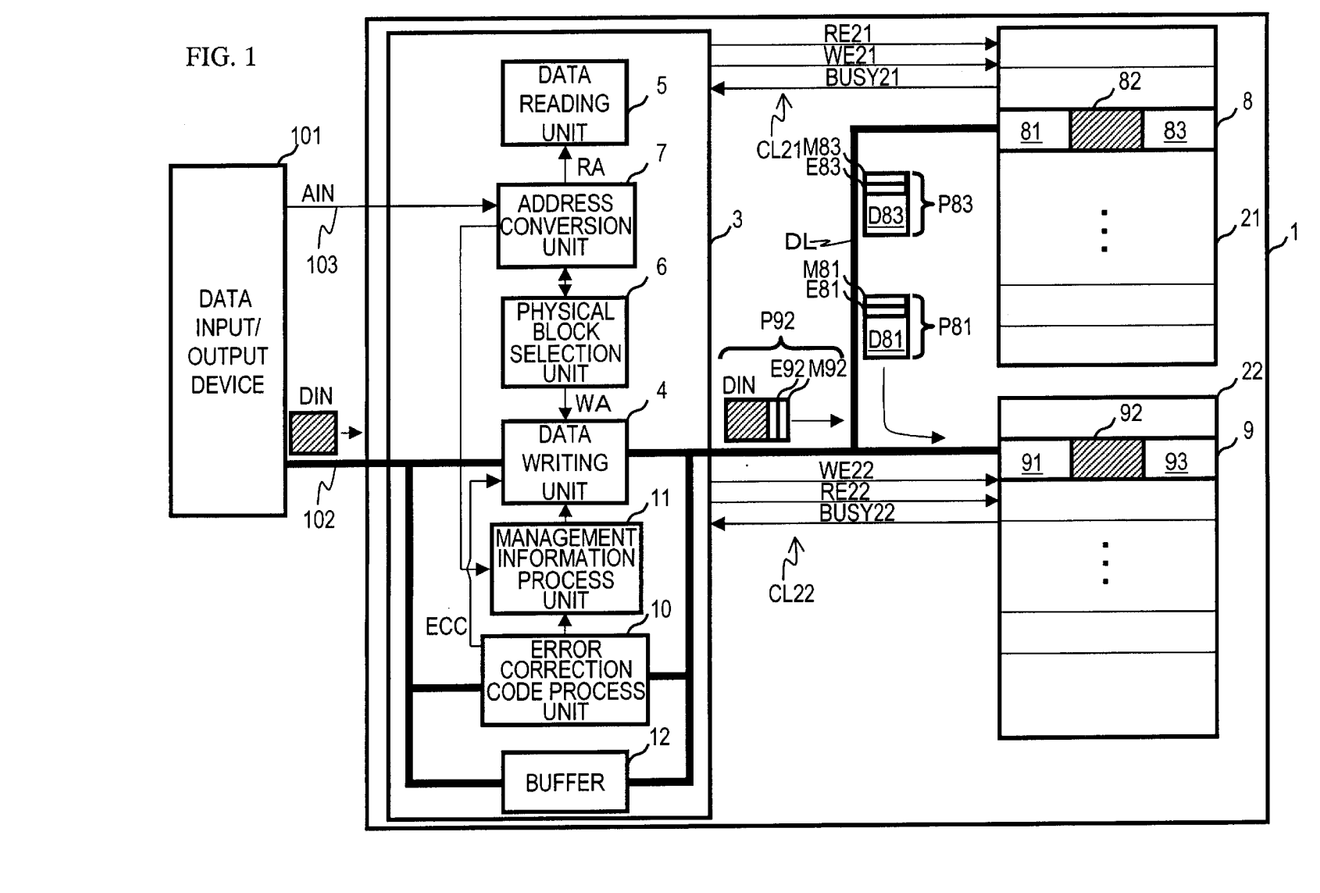
FIG. 1 is a diagram showing the schematic structure of a memory device of an embodiment.

Referring to FIG. 1, a memory device 1 in the present embodiment is connected to an external data input/output device 101 via a data line 102 and an address line 103. Data input/output is done between the memory device 1 and the data input/output device 101 over the data line 102. To the address line 103, provided is a logic address AIN on which data DIN to be inputted from the data input/output device 101 to the memory device 1 is written. Other than the logic address AIN, provided to the address line 103 is a logic address used for reading data to be outputted from the memory device 1 to the data input/output device 101.

The memory device 1 is provided with a plurality of flash memory chips 21 and 22, and a controller chip 3. FIG. 1 example shows only two flash memory chips 21 and 22, but the number thereof is not restrictive thereto.

Data writing to the flash memory chips 21 and 22 is carried out on a page-by-page basis. One page size is 528 bytes, for example. Out of these one-page 528 bytes, allocated to a data region used for data storage is presumably a region of 512 bytes, e.g., 1 to 512 bytes.

Data deletion is done on a physical block basis. The flash memory chip 21 includes a plurality of physical blocks 8, and the flash memory chip 22 includes a plurality of physical blocks 9. The physical blocks 8 and 9 are each provided with a plurality of pages, e.g., 32 pages. Here, expediently, the physical block 8 includes three pages 81, 82, and 83, and the physical block 9 includes three pages 91, 92, and 93.

In FIG. 1 example, the flash memory chips 21 and 22 are connected with the controller chip 3 via control lines CL21 and CL22, respectively. For the connection, also used is a data line DL shared by the flash memory chips 21 and 22.

For data writing/reading to/from the flash memory chips 21 and 22, transfer timing is synchronous with writing synchronous signals WE21 and WE22 and reading synchronous signals RE21 and RE22, which are respectively provided to the control lines CL21 and CL22. To establish synchronization, a rising edge of the writing synchronous signal WE21 or WE22, or the reading synchronous signal RE21 or RE22 is used as a reference. To the control lines CL21 and CL22, also provided are busy signals BUSY21 and BUSY22, respectively. The busy signals BUSY21 and BUSY22 each indicate that a program is running in the corresponding flash memory chip 21 or 22.

Not only for data transfer, the data line DL may be used for address transfer, command transfer, status transfer, or the like. Assuming that the data line DL is 8 bits in bit width, data transfer is carried out on an 8-bit basis, i.e., on a byte basis. Under this assumption, before the data of a page, i.e., data of 528 bytes, is completely transferred, a rising edge of any corresponding signal, i.e., the reading synchronous signal RE21 or RE22, or the writing synchronous signal WE21 or WE22, is formed for 528 times.

The data line DL is shared by the flash memory chips 21 and 22. The controller chip 3 can control the flash memory chips 21 and 22 separately by using the corresponding control lines CL21 and CL22. Such a structure allows the controller chip 3 to, simultaneously with data reading from one flash memory chip to the data line DL, write the read data to the other flash memory chip.

The controller chip 3 receives the data DIN and the logic address AIN, which are inputted from the data input/output device 101 to the memory device 1.

In the controller chip 3, an address conversion unit 7 generates address conversion information for notification to a management information process unit 11, and the like. The address conversion information is used to interrelate the inputted logic address AIN to the address of a physical block to which the inputted data DIN is written. In a case where such address conversion information corresponding to the inputted logic address has been already generated, the address conversion unit 7 uses the address conversion information to convert the logic address to the address of the corresponding physical block. The result is then notified to a data reading unit 5, and the like.

If the save process is to be executed, the address conversion unit 7 notifies the address of the physical block also to a physical block selection unit 6. In response, the address conversion unit 7 receives an address of another physical block from the physical block selection unit 6, and updates the current address conversion information.

In accordance with the address of the physical block notified from the address conversion unit 7, the data reading unit 5 issues a request to the flash memory chip 21 or 22 for data reading. When the request is accepted by the flash memory chip 21 or 22, the control line CL21 or CL22 is provided with the reading synchronous signal RE21 or RE22. In synchronization with the signal provision, the data is read to the data line DL.

Thereafter, if the save process is to be executed, the data reading unit 5 reads data for saving. The data to be saved is, in a physical block including a page requested for data writing (in the below, referred to as requested page), the one written in a page(s) not requested for data writing. Assuming here that the page 82 of the physical block 8 in the flash memory chip 21 is the requested page, for the save process, the data written in page 82 is not read for data saving but the data in pages 81 and 83 is.

Figure 2:
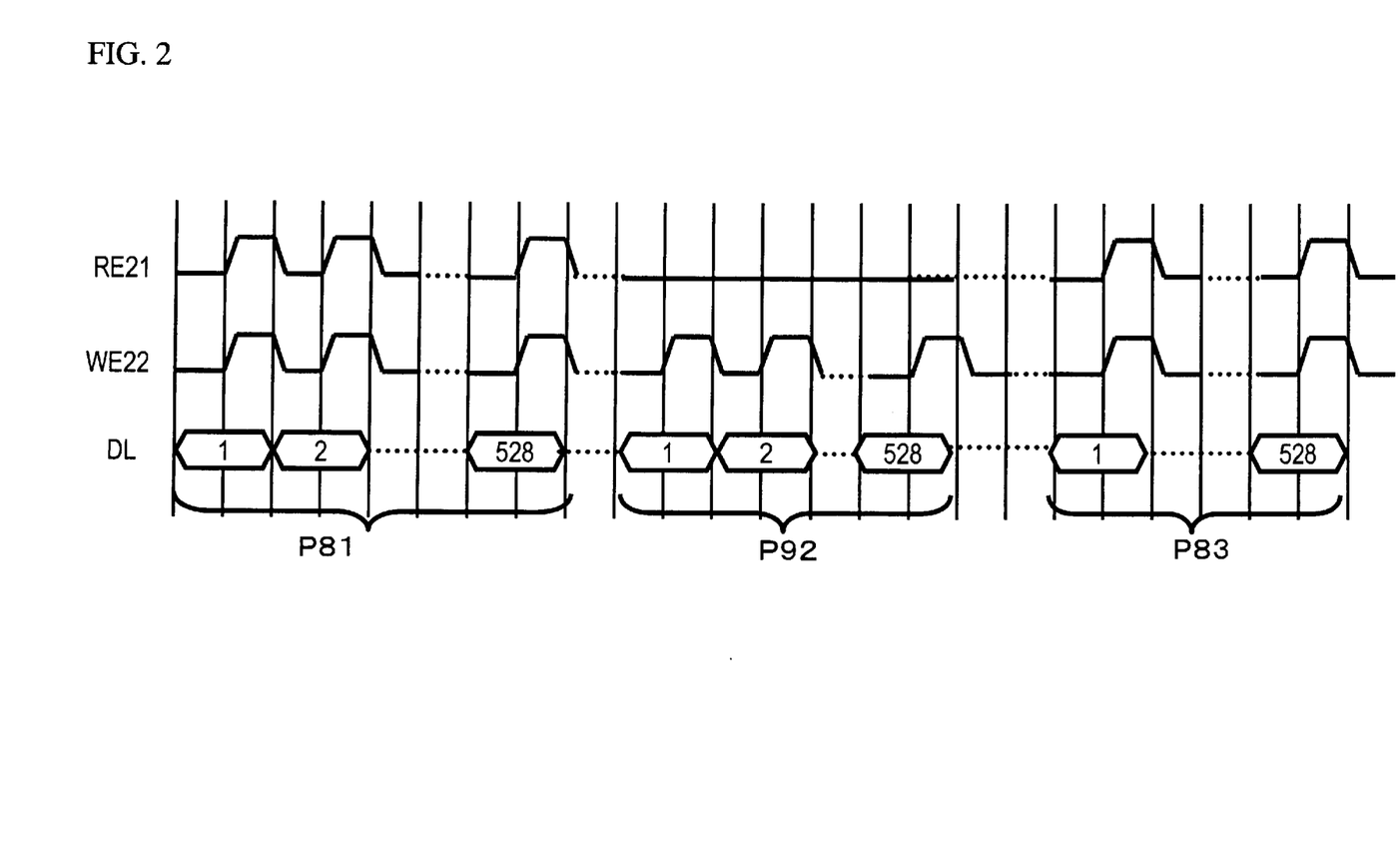
FIG. 2 is a timing diagram for demonstrating a save process executed in the memory device of the embodiment.

For such data reading, referring to FIG. 2, the reading synchronous signal RE21 is formed with a rising edge for 528 times during the first 1056 cycles. Then, in the next 1056 cycles shown in FIG. 2, no rising edge is formed, but in the last 1056 cycles shown in FIG. 2, a rising edge is formed again for 528 times.

In synchronization with such a reading synchronous signal RE21, read to the data line DL is the data of page 81 during the first 1056 cycles. The data of page 83 is read during the last 1056 cycles shown in FIG. 2.

The physical block selection unit 6 makes a selection of a physical block including a page to which the data read for data saving and the data DIN provided from the data input/output device 101 are both written. The selection is made out of any writable physical block(s) in any flash memory chip not carrying the physical block including the requested page. Once the data is deleted, the physical block becomes writable. In the above example, if the physical block including the requested page is the physical block 8, selected is the physical block 9 as satisfying such a condition.

The address of thus selected physical block is notified by the physical block selection unit 6 to the address conversion unit 7 and the data writing unit 4.

If the save process is to be executed, the data writing unit 4 issues a writing request to the flash memory chip including the physical block selected by the physical block selection unit 6. The request is the one asking for writing the data read by the data reading unit 5 to the data line DL and the inputted data DIN. Once the flash memory chip accepts this request, the control line CL is provided with a writing synchronous signal. In synchronization therewith, writing is started. In FIG. 2 example, during the first 1056 cycles, the writing synchronous signal WE22 corresponding to the flash memory chip 22 is formed with rising edges simultaneously with those for the reading synchronous signal RE21 corresponding to the flash memory chip 21. As a result, the data of page 81 read to the data line DL is transferred, and then written to the page 91 included in the physical block 9 of the flash memory chip 22. During 1056 cycles after the program is through as the data of page 81 is transferred to the flash memory chip 22, no rising edge is formed to the reading synchronous signal RE21. To the writing synchronous signal WE22, on the other hand, a rising edge is formed for 528 times. As a result, the inputted data DIN is transferred, and then written to the page 92 of the physical block 9. After the program is through as the data DIN is transferred to the flash memory chip 22, during the last 1056 cycles in FIG. 2, both the reading synchronous signal RE21 and the writing synchronous signal WE22 are formed with rising edges. Accordingly, the data of page 83 read to the data line DL is transferred, and then written to the page 93 in the physical block 9.

In such a manner, the data of pages 81 and 83 is successfully all saved and the inputted data DIN is written to the physical block 9. Then, the data writing unit 4 deletes the data from the physical block 8. After data deletion, the address conversion unit 7 updates the address conversion information of the logic address AIN that the logical address AIN corresponds to the address of the physical block 9. Accordingly, in the sight of the data input/output device 101, the data of page 82 is practically overwritten to the data DIN. Moreover, as a result of simultaneous data reading and writing, the writing speed remains high even at the time of data rewriting.

To solve problems associated with data transfer with direct memory access, an error correction code process unit 10 is used.

The error correction code process unit 10 generates an error correction code for the inputted data DIN. Thus generated error correction code is added to the data DIN. The data writing unit 4 then writes the resulting data DIN added with the error correction code. Out of 528 bytes of a page, assuming that a data region is 512 bytes, e.g., 1 to 512 bytes, allocated to the error correction code is a region of 6 bytes, e.g., 513 to 518 bytes.

As the save process proceeds, after the data reading unit 5 reads the data to the data line DL for data saving, the error correction code process unit 10 refers to the error correction code read after the data to detect if the data contains any error. If contains any, the data is accordingly corrected.

In detail, if the data is detected as containing any error by referring to the error correction code, the error correction code process unit 10 corrects the error if correctable. If uncorrectable, uncorrectable error detection information is notified to the management information process unit 11 to tell that the error detected in the data is uncorrectable.

Here, in FIG. 2 example, assuming that the error correction code process unit 10 detects an error in the 2nd byte in the data of page 81 read to the data DL. Shown in FIG. 3 are the reading synchronous signals RE21, WE22, and the data line DL in such a case.

Figure 3:
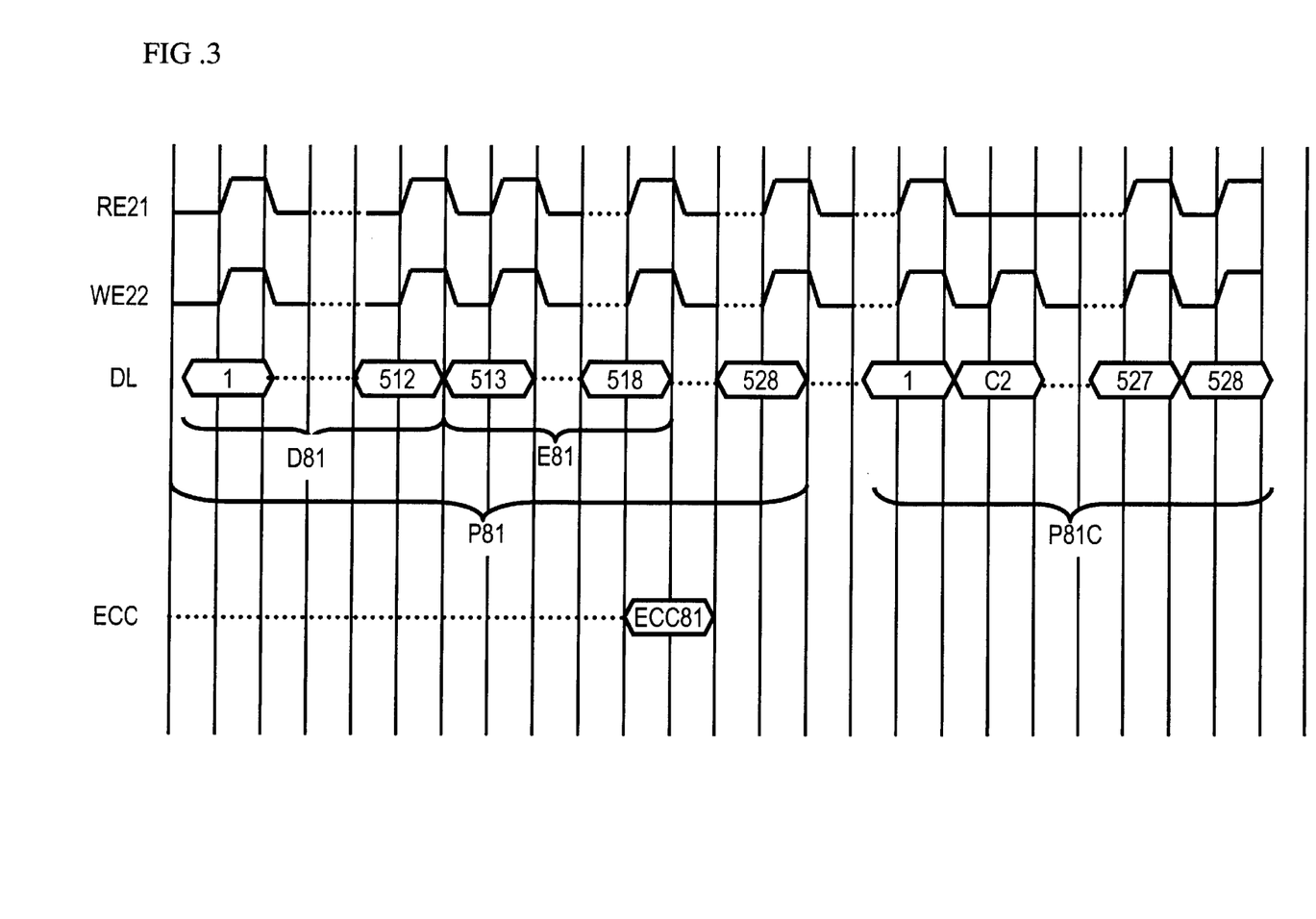
FIG. 3 is a timing diagram in a case where an error correction process is carried out in the save process.

Referring to FIG. 3, in the first 1024 cycles, data D81 in the data region of page 81 is read to the data line DL. Thereafter, between 1025 cycles to 1036 cycles, read to the data line DL this time is an error correction code E81 corresponding to the read data D81.

After the data D81 and the error correction code E81 are both read out, the error correction code process unit 10 detects any error through comparison between the error correction code E81 and another error correction code as a result of calculating the data D81. Then outputted therefrom is an error detection result ECC81, which includes information telling if there is any error, and if any, correctable or not. Assuming now that the error correction code process unit 10 detects an error in the 2nd byte in the data D81 by referring to the error correction code E81. If the detected error is correctable, data reading and writing of the data in page 81 is preformed during the next 1056 cycles shown in FIG. 3. Note here that, in the 4th cycle of these 1056 cycles, the reading synchronous signal RE21 is formed with no rising edge but the writing synchronous signal WE22 is. The erroneous 2nd byte is not read out from the flash memory chip 21. At the time of data writing to the 2nd byte, data C2 as a result of error correction executed by the error correction code process unit 10 is written by the data writing unit 4 to the page 91.

In such a manner, even if the data read for data saving is erroneous, the error never fails to be detected before data writing to the selected block. Thanks thereto, the problems resulted from the characteristics of the flash memory chips become less influential in the save process.

The management information process unit 11 generates management information for managing the inputted data DIN. Thus generated management information is added to the data DIN. The management information includes the address conversion information notified by the address conversion unit 7, for example. If the uncorrectable error detection information is notified by the error correction code process unit 10, the information is also included in the management information.

The data writing unit 4 writes the data DIN added with the management information. Out of 528 bytes of a page, assuming that 512 bytes from 1 to 512 are allocated to a data region, and 6 bytes from 513 to 518 are to an error correction code, allocated to the management information is a region of 10 bytes from 519 to 528 bytes, for example.

Not only to the inputted data DIN, the management information process unit 11 adds management information every time new data is read to the data line DL as the save process proceeds.

Figure 4:
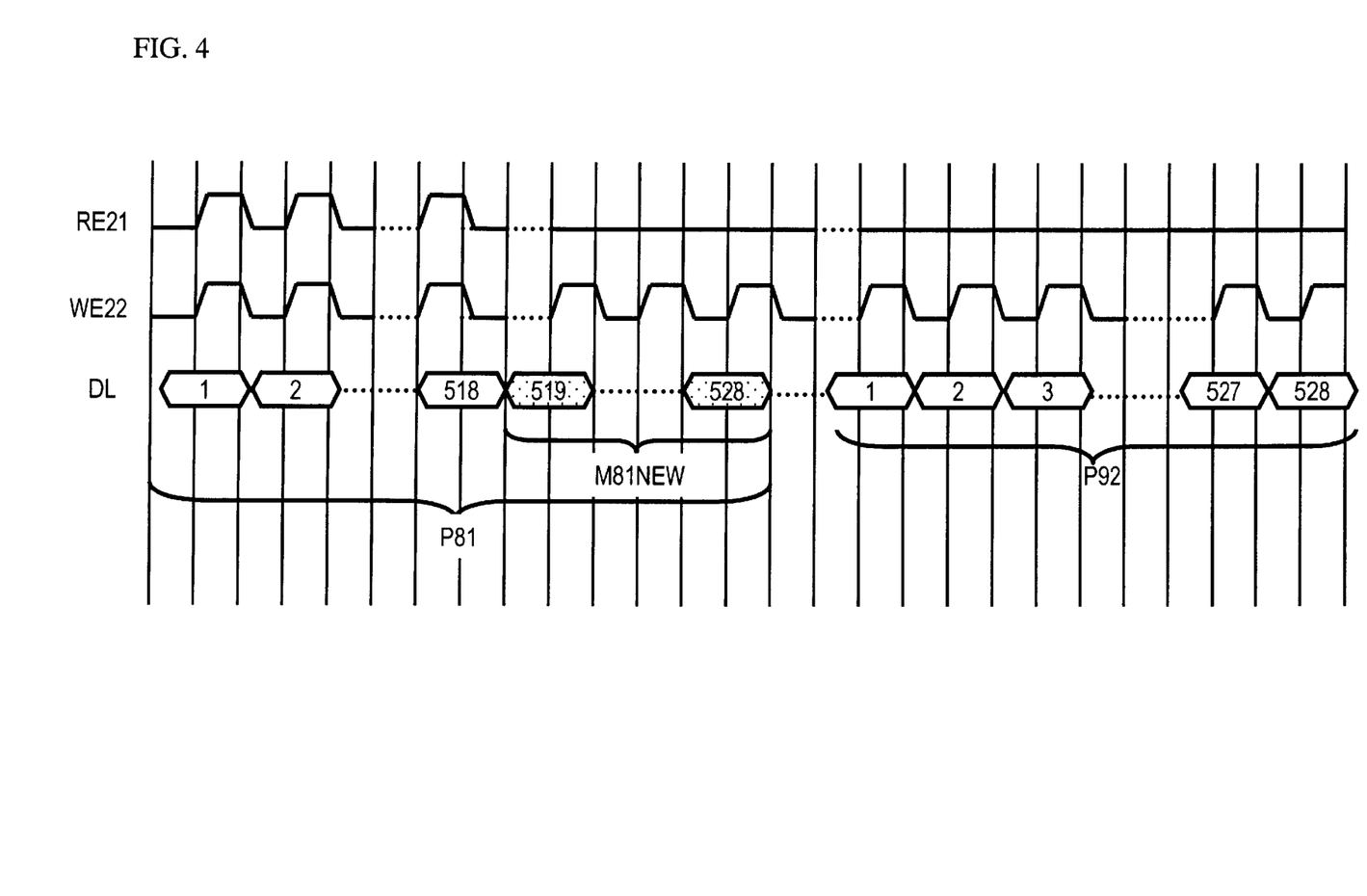
FIG. 4 is a timing diagram in a case where management information is updated in the save process.

For such information addition, there is no need to read the management information having been already included in the page. Unlike FIG. 2 example having been formed with a rising edge for 528 times in the first 1056 cycles, the reading synchronous signal RE21 may be formed with a rising edge for 518 times between 1 to 1052 cycles.

The writing synchronous signal WE22 is formed with a rising edge for 528 times in the first 1056 cycles. In synchronization with, respectively, the rising edges between 1037 cycles to 1056 cycles, the data writing unit 4 transfers and writes management information M81NEW to the page 91. Here, the management information M81NEW is the one newly added to the corresponding data by the management information process unit 11. Similarly to the management information to the data of page 81, the management information to the data of page 83 to be written to page 93 is also updated.

As such, by updating the management information coming with the corresponding data read for saving, even if the power is shut down before data deletion in a block including a requested page, the management information easily tells which data is the newer after power is on. Accordingly, the problems resulted from the characteristics of the flash memory chips successfully become less influential in the save process.

Once the data transfer is done to the corresponding flash memory chip in synchronization with the writing synchronous signal WE21 or WE22, the flash memory chip 21 or 22 starts to run a program and changes the busy signal BUSY21 or BUSY22. Until the program is through, the flash memory chip 21 or 22 keeps the status of the busy signal BUSY21 or BUSY22.

When the busy signals BUSY21 or BUSY22 returns to its original status, the data writing unit 4 reads a program status (PSTS) to check whether the program has been properly through.

A buffer 12 is exemplified by SRAM, the size of which is a page or more. In case of program error, the buffer 12 may be used for temporarily storing the data that has been read for saving.

Figure 5:
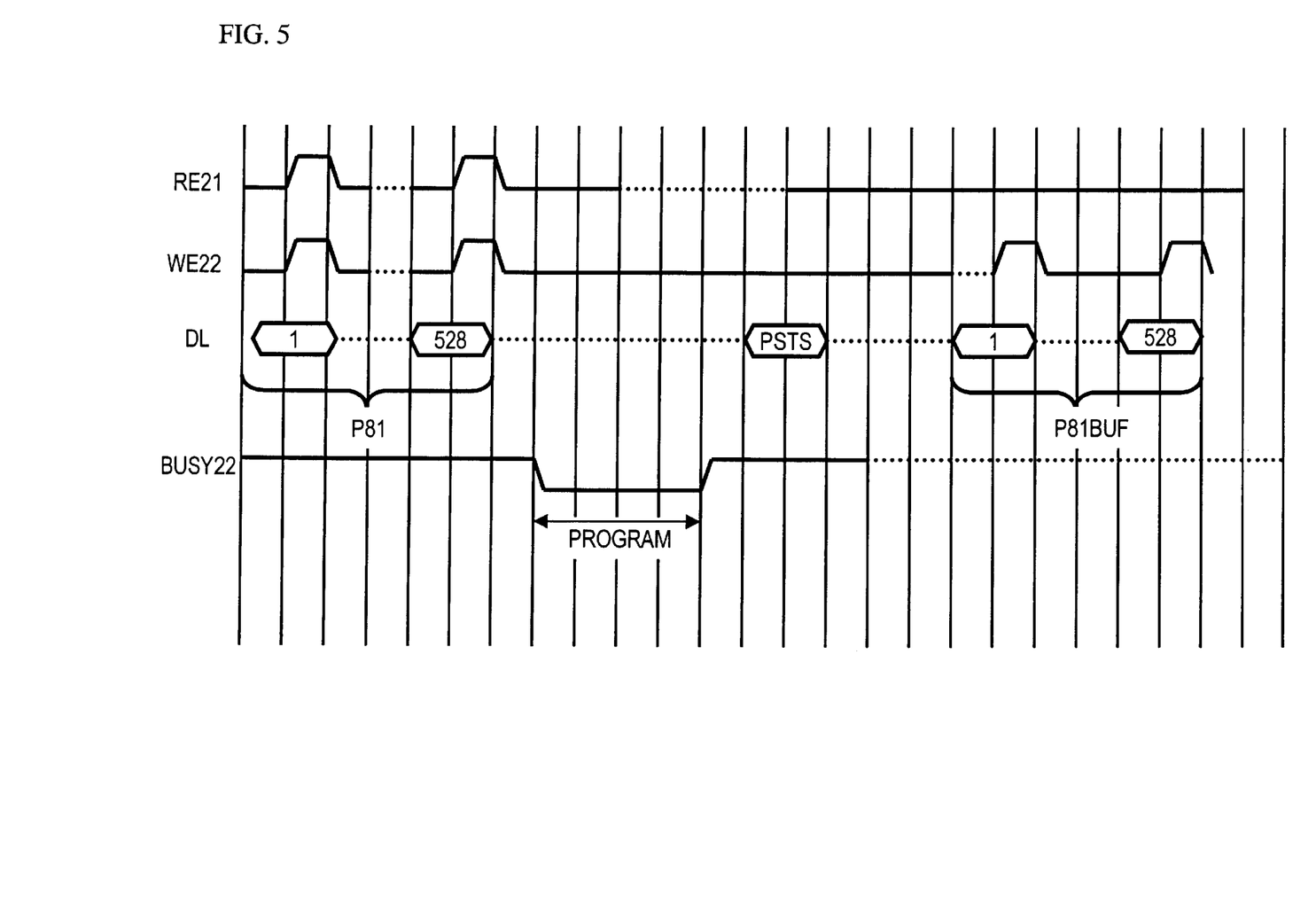
FIG. 5 is a timing diagram in a case where data reading from a buffer is done in the save process.

As shown in FIG. 5, presumably, when the data of page 81 is read to the data line DL by the data reading unit 5, thus read data is simultaneously transferred by the data writing unit 4 to be written to the page 91 in the physical block 9 in the flash memory chip 22.

The buffer 12 temporarily stores the data of page 81 read to the data line DL.

After the flash memory chip 22 is through with the program, and after the busy signal BUSY22 returns to its original status, the data reading unit 5 reads the program status. If the program status tells the controller chip 3 that a program error has occurred, the control line CL21 is not provided with the reading synchronous signal RE21. Accordingly, written by the data writing unit 4 is not the data in the flash memory chip 21 but the data of page 81 read from the buffer 12.

As such, there is no more need to access the flash memory chip to read again the data because the data read from the flash memory chip for data saving is temporarily stored in the buffer. Thus, even if a program error occurs, the power consumption associated therewith can be lowered, and the time for data reading can be shorter. Therefore, the problems resulted from the characteristics of the flash memory chips can be less influential in the save process.

The memory device 1 may include any one of the error correction code process unit 10, the management information process unit 11, and the buffer 12, or any specific combination thereof will do.

As an example, the error correction code process unit 10 and the buffer 12 may be used together. If so, after data reading to the data line DL, the buffer 12 stores the data temporarily. Based on the error correction code added to the data, the error correction code process unit 10 checks if the data contains any error. If any correctable error is detected thereby, the error correction code process unit 10 in this case applies data correction to the data stored in the buffer 12, unlike the above example in which the corresponding flash memory chip is accessed for data rereading. Thereafter, the data writing unit 4 may simply write the error-corrected data to the flash memory chip.

As a result, there is no more need to access the flash memory chip for data error correction, successfully lowering power consumption associated therewith. What is more, the time taken for data error correction can be shorter without accessing to the flash memory chip.

Alternatively, considered is a case where the error correction code process unit 10, the management information process unit 11, and the buffer 12 are used together as in FIG. 1 example. If this is the case, when detecting any uncorrectable error, the error correction code process unit 10 issues the uncorrectable error detection information to the management information process unit 11. In response, the management information process unit 11 provides the uncorrectable error detection information to management information before newly adding to the data.

In this manner, the management information written together with the data helps easy determination whether the data carries any uncorrectable error.

Figure 6:
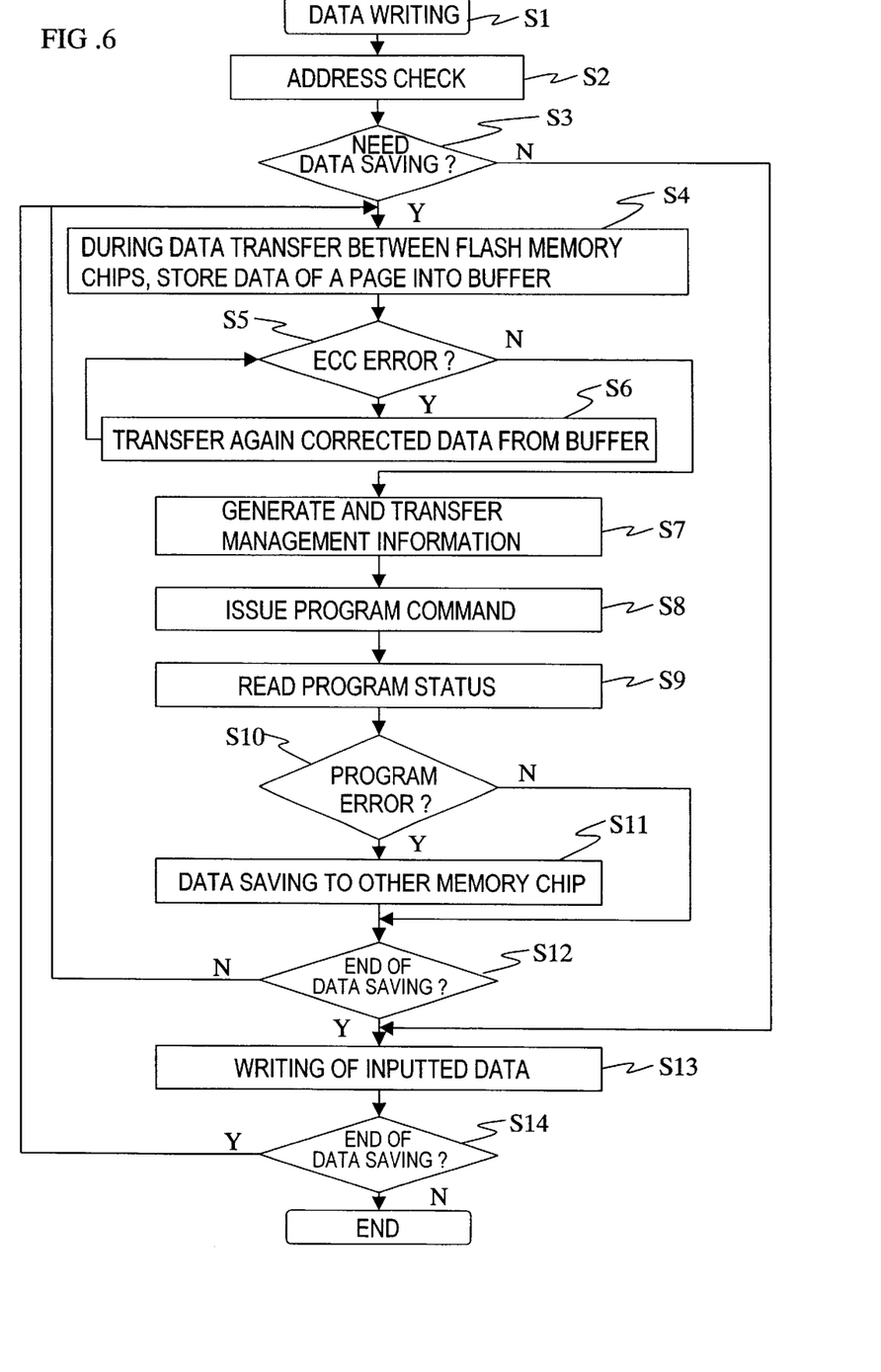
FIG. 6 is a flowchart for demonstrating a data processing method in the memory device of the embodiment.

FIG. 6 is a flowchart for demonstrating a data processing method in the memory device in a case where there is no error, or even if any, the error is correctable. If the memory device 1 includes the error correction code process unit 10, the management information process unit 11, and the buffer 12, the above described save process can be carried out by going through combined series of procedures.

First, the controller chip 3 receives a writing instruction from the external data input/output device 101 (S1). In response to an address AIN to which incoming data DIN is written, the controller chip 3 checks the address AIN (S2). The controller chip 3 then determines whether data saving is needed based on a page(s) locating before a requested page in the block already carry data (S3). Here, as to the pages 81, 82, and 83 written in the same block, if the address AIN is corresponding to a physical address of the page 82, it means that the page 81 is locating before the page 82. If this is the case, the controller chip 3 determines as data D81 of page 81 requiring data saving. Responsively, the data reading unit 5 reads the data to the data line DL, and the data writing unit 4 then transfers the data on the data line DL to the corresponding flash memory chip for writing (S4). In the meantime, the buffer 12 stores the data of a gage. In this example, the corresponding flash memory chip is the flash memory chip 22, which is not the flash memory chip 21 including the block 8. When the data and the corresponding error correction code are read to the data line DL, the error correction code process unit 10 responsively performs error detection to the data (S5). If there is any correctable error, the error correction code process unit 10 corrects the data stored in the buffer 12. The data writing unit 4 transfers again the corrected data to the applicable flash memory chip (S6). If the data read to the data line DL is not erroneous, or if the corrected data is transferred again, the management information process unit 11 generates management information for the data, and the data writing unit 4 then transfers thus generated management information to the applicable flash memory (S7). Once the data and the management information are transferred to the flash memory chip, the data writing unit 4 issues a program command with respect to the writing block of the flash memory chip (S8). If the data transferred to the flash memory chip 22 is the data D81, the data D81 is written to the page 91 of the block 9. After the program is through, the data writing unit 4 reads a program status (S9) to see whether there is any program error occurred (S10). If occurred, the procedure returns to S4 to try again data saving with respect to another flash memory chip, for example (S11). As to the data stored in the buffer 12, the data is transferred again from the buffer. Assuming that a program error occurs to the block 9 of the flash memory chip 22, and the data is read from the block 8 of the flash memory chip 21, the data is saved to any other flash memory chips that are not shown. If the program is correctly through, or if the saving is done again, the controller chip 3 determines whether the saving is now through (S12). The determination factor here is whether the data in the page(s) locating before the requested page is all saved, and if saved, the controller chip 3 determines that the saving has been through. Assuming that the requested page is the page 82, the data in the page(s) locating therebefore is only the data D81 as already described. In this case, after the data D81 is saved to the block 9, the controller chip 3 determines that the data saving is now through. If the data is not yet saved, the procedure repeats from S4 to S12 until the data is successfully saved. When the data saving is determined as not required in S8, or if the data in the page(s) locating before the requested page is all saved, the data writing unit 4 writes the data DIN to the block to which the saved data has been written (S13). Once the data DIN is written, the controller chip 3 then determines whether data saving is required based on whether the page(s) locating after the requested page in the block carry any data (S14). As to the pages 81 and 83 in the same block 8 as the page 82, the page 83 is locating after the page 82. Thus, the controller chip 3 determines that data D83 of the page 83 needs to be saved. If determined so, the procedure after S4 is repeated until no saving is needed, and this is the end of the save process (S15).

Here, such a procedure can be realized by any specific logic, or through the cooperation of the program and a microprocessor or memory.

In the above example, used for connection between the memory device 1 and the external input/output device 101 are the data line 102 and the address line 103. Such a structure is not surely restrictive. The data line 102 and the address line 103 do not need to be separately provided, but using the same line will do for the purpose. This is preferably for a small-sized portable memory card because the number of pins is reduced thereby.

Also in the above example, described is a case where data transfer is carried out between nonvolatile memory chips for the save process, but surely this is not restrictive. Data transfer may be carried out between nonvolatile memory chips to avoid data fragmentation. In such a case, data transfer between nonvolatile memory chips can be performed by going through the procedure from S4 to S12 of FIG. 6. Thereby, similarly to the save process, any other process can solve the problems resulted from the characteristics of the nonvolatile memory chips during data transfer therebetween.

As described above, in the present invention, an error correction process is executed to data to be transferred between nonvolatile memory chips. Therefore, even if the data contains any error, the error never fails to be detected before data writing. Similarly, the management information of the data is always updated before data transfer between nonvolatile memory chips. Accordingly, if power is shut down before data deletion from one nonvolatile memory chip being a data source, the management information cab be a clue, telling which nonvolatile memory chip carries the newer data when the power is turned on. Further, if the transferring data is stored in a buffer temporarily, there is no more need to read the data again from the nonvolatile memory chip even if a program error occurs. As a result, successfully, the power consumption is reduced, and the time taken for data reading is shortened. As a whole, the problems resulted from the characteristics of the nonvolatile memory chips can be less influential even if data transfer is performed at high speed with direct memory access.

While the invention has been described in detail, the foregoing description is in all aspects illustrative and not restrictive. It is understood that numerous other modifications and variations can be devised without departing from the scope of the invention.

The invention claimed is:

1. A memory device in which a nonvolatile memory chip is plurally provided to be separately controllable but sharing a data line, the memory device comprising:
   an error correction code process unit operable to generate an error correction code to be added to data before data writing to a nonvolatile memory chip, and refer to an error correction code for data read from a nonvolatile memory chip to the data line to apply error detection to or error detection and correction to the data; and
   a writing unit operable to, before writing data read from a nonvolatile memory chip to the data line to a nonvolatile memory chip different from the one from which the data is read, if the data is detected as containing a correctable error, write the data in which the error is corrected.

2. The memory device according to claim 1, further comprising a buffer for temporary data storage, wherein
   when the error in data is detected as correctable, the error correction code process unit applies error correction to the data provided from the data line to the buffer, and the writing unit writes the data stored in the buffer.

3. A memory device in which a nonvolatile memory chip is plurally provided to be separately controllable but sharing a data line, the memory device comprising:
   a management information process unit operable to generate management information for data management not only to incoming data but also to data read from a nonvolatile memory chip to the data line and written to a nonvolatile memory chip different from the one from which the data is read; and
   a writing unit operable to perform data writing to a nonvolatile memory chip together with the management information.

4. A memory device in which a nonvolatile memory chip is plurally provided to be separately controllable but sharing a data line, the memory device comprising:
   a buffer for temporary data storage; and
   a writing unit operable to, if a program error occurs to data read from a nonvolatile memory chip to the data line and transferred to a nonvolatile memory chip different from the one from which the data is read, write the data stored in the buffer from the data line.

5. The memory device according to claim 4, further comprising an error correction code process unit operable to generate an error correction code to be added to data before data writing to a nonvolatile memory chip, and refer to an error correction code for data read to the data line from a nonvolatile memory chip to detect whether the data contains a correctalbe error and apply error correction to the data if the error is detected, and wherein
   when the data read from a nonvolatile memory chip to the data line is written to a nonvolatile memory chip the one from which the data is read, if the error in the data is detected as correctable, the writing unit writes the corrected data stored in the buffer.

6. The memory device according to claim 5, further comprising a management information process unit operable to generate, for data management, management information not only to incoming data but also to data read from a nonvolatile memory chip to the data line and written into a nonvolatile memory chip different from the one from which the data is read, and
   the writing unit performs data writing to a nonvolatile memory chip together with the management information.

7. The memory device according to claim 6, wherein when the data is detected as containing an uncorrectable error, the management information process unit provides, to the management information to be added to the data, uncorrectable error detection information indicating that the error in the data is detected as uncorrectable.

8. The memory device according to claim 7, wherein the nonvolatile memory chip is a flash memory chip in which a block being a data deletion unit includes a plurality of pages each being a data writing unit.

9. The memory device according to claim 8, comprising a block selection unit operable to select, when data written in a page of a block is saved before data deletion applied to the block, a block including a page written with the data to be saved from any writable block in a flash memory chip not including the block from which the data is deleted.

10. A data processing method for a memory device in which a nonvolatile memory chip is plurally provided to be separately controllable but sharing a data line, the method comprising the steps of:
    performing error detection when data read from a nonvolatile memory chip to the data line is written to a nonvolatile memory chip different from the one from which the data is read; and
    when the data is detected as containing a correctable error, performing data writing after the error is corrected.

11. A data processing method for a memory device in which a nonvolatile memory chip is plurally provided to be separately controllable but sharing a data line, the method comprising the steps of:
    when data read from a nonvolatile memory chip to the data line is written to a nonvolatile memory chips different from the one from which the data is read, generating management information for management of the data; and
    writing the data to the corresponding nonvolatile memory chip together with the generated management information.

12. A data processing method for a memory device in which a nonvolatile memory chip is plurally provided to be separately controllable but sharing a data line, the method comprising the steps of:

transferring data read from a nonvolatile memory chip to the data line to a nonvolatile memory chip different from the one from which the data is read; and when a program error occurs to the transferred data, writing the data stored into a buffer from the data line.

13. A data processing program for a memory device in which a nonvolatile memory chip is plurally provided to be separately controllable but sharing a data line, the program comprising the steps of, for computer execution:

performing error detection when data read from a nonvolatile memory chip to the data line is written to a nonvolatile memory chip different from the one from which the data is read; and when the data is detected as containing a correctable error, performing data writing after the error is corrected.

14. A data processing program for a memory device in which a nonvolatile memory chip is plurally provided to be separately controllable but sharing a data line, the program comprising the steps of, for computer execution:

when data read from a nonvolatile memory chip to the data line is written to a nonvolatile memory chips different from the one from which the data is read, generating management information for management of the data; and writing the data to the corresponding nonvolatile memory chip together with the generated management information.

15. A data processing program for a memory device in which a nonvolatile memory chip is plurally provided to be separately controllable but sharing a data line, the program comprising the steps of, for computer execution:

transferring data read from a nonvolatile memory chip to the data line to a nonvolatile memory chip different from the one from which the data is read; and when a program error occurs to the transferred data, writing the data stored into a buffer from the data line.

* * * * *